United States Patent
Schoner

(10) Patent No.: US 7,957,606 B2
(45) Date of Patent: Jun. 7, 2011

(54) SYSTEM AND METHOD FOR EDGE SHARPENING

(75) Inventor: Brian Schoner, Fremont, CA (US)

(73) Assignee: Broadcom Corporation, Irvine, CA (US)

(*) Notice: Subject to any disclaimer, the term of this patent is extended or adjusted under 35 U.S.C. 154(b) by 1289 days.

(21) Appl. No.: 11/491,599

(22) Filed: Jul. 24, 2006

(65) Prior Publication Data
US 2008/0019606 A1    Jan. 24, 2008

(51) Int. Cl.
*G06K 9/40* (2006.01)
*G06K 15/00* (2006.01)
*G09G 5/00* (2006.01)

(52) U.S. Cl. .......................... 382/263; 358/1.2; 345/626

(58) Field of Classification Search .................. 382/205, 382/217–221, 254, 263, 266, 269, 274, 275; 358/1.2, 447, 451, 463, 530, 532, 533, 537, 358/448, 467; 375/254; 345/626, 660, 671
See application file for complete search history.

(56) References Cited

U.S. PATENT DOCUMENTS

| | | | |
|---|---|---|---|
| 5,508,823 A * | 4/1996 | Kiyohara et al. | 358/463 |
| 5,917,961 A * | 6/1999 | Huonder | 382/279 |
| 6,094,511 A * | 7/2000 | Metcalfe et al. | 382/260 |
| 6,195,467 B1 * | 2/2001 | Asimopoulos et al. | 382/261 |
| 6,731,823 B1 * | 5/2004 | Gallagher et al. | 382/266 |
| 6,807,313 B1 * | 10/2004 | Allen et al. | 382/254 |
| 6,847,738 B1 * | 1/2005 | Scognamiglio et al. | 382/260 |
| 7,054,474 B1 * | 5/2006 | Krieger | 382/128 |

* cited by examiner

*Primary Examiner* — Kanji Patel
(74) *Attorney, Agent, or Firm* — McAndrews Held & Malloy Ltd.

(57) ABSTRACT

Presented herein are a system and method for sharpening edges in a region. In one embodiment, there is presented a method for sharpening edges. The method comprises measuring differences between at least a value associated with a first pixel and a value associated with a second pixel of a plurality of pixels; and applying a sharpening mask to the plurality of pixels, wherein the sharpening mask is a function of at least one of the measured differences, a first value associated with any one of the plurality of pixels, and a second value associated with any other of the pixels, thereby resulting in sharpened pixels.

56 Claims, 11 Drawing Sheets

405

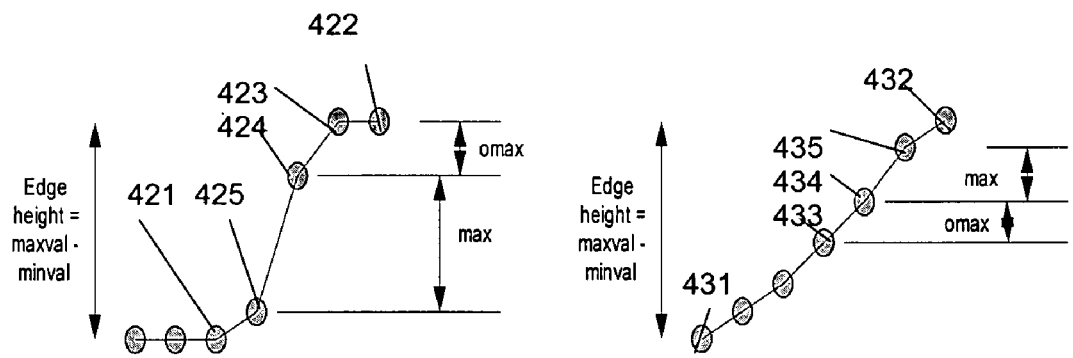
FIGURE 5B            FIGURE 5C
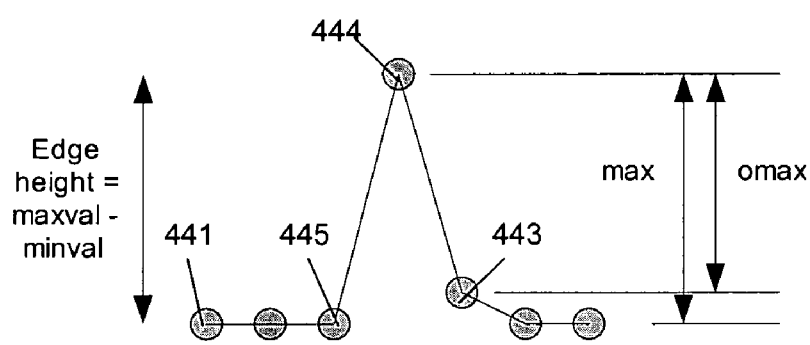
FIGURE 5D

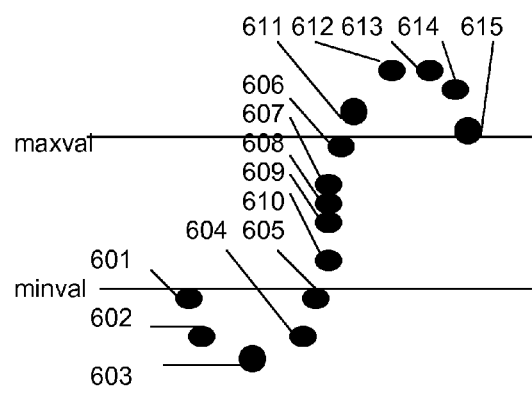
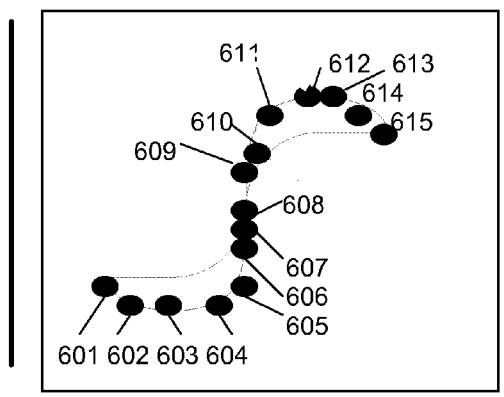
FIGURE 6A     FIGURE 6B

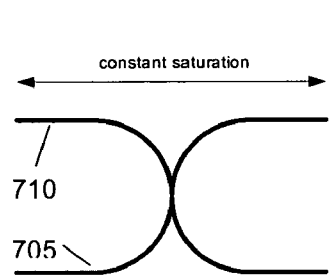 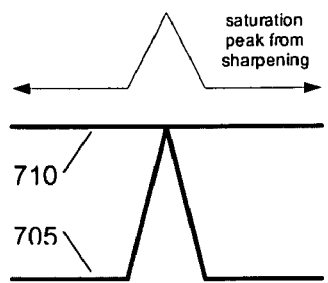
FIGURE 7A    FIGURE 7B

SYSTEM AND METHOD FOR EDGE SHARPENING

RELATED APPLICATIONS

This application is related to SYSTEM AND METHOD FOR CORRECTING CHROMA PIXELS, application Ser. No. 11/563,457, filed Nov. 27, 2006, which is incorporated herein by reference for all purposes.

FEDERALLY SPONSORED RESEARCH OR DEVELOPMENT

Not Applicable

MICROFICHE/COPYRIGHT REFERENCE

Not Applicable

BACKGROUND OF THE INVENTION

Sharpening can be used to partially correct blurry video. Video blurriness can be caused by a variety of factors, such as an improperly focused lens and scaling. Sharpening attempts to emphasize edges in the video picture.

There are several drawbacks that can occur when sharpening. For example, sharpening can also emphasize noise. Additionally, sharpening can inappropriately sharpen smooth color transitions. Additionally, sharpening can overemphasize edges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for sharpening edges substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 5B is a graph of values for exemplary pixels forming a sharp edge;

FIG. 5C is another graph of values for exemplary pixels forming a dull edge;

FIG. 5D is a graph of values for exemplary pixels characteristic of having impulsive noise;

FIG. 6A is graph of values for exemplary sharpened pixels;

FIG. 6B is a graph of values for sharpened pixels that are corrected for oversharpening in accordance with an embodiment of the present invention;

FIG. 7A is a graph of chroma red and chroma blue values for exemplary pixels;

FIG. 7B is a graph of sharpened chroma red and chroma blue values for the exemplary pixels;

DETAILED DESCRIPTION OF THE INVENTION

Figure 1:
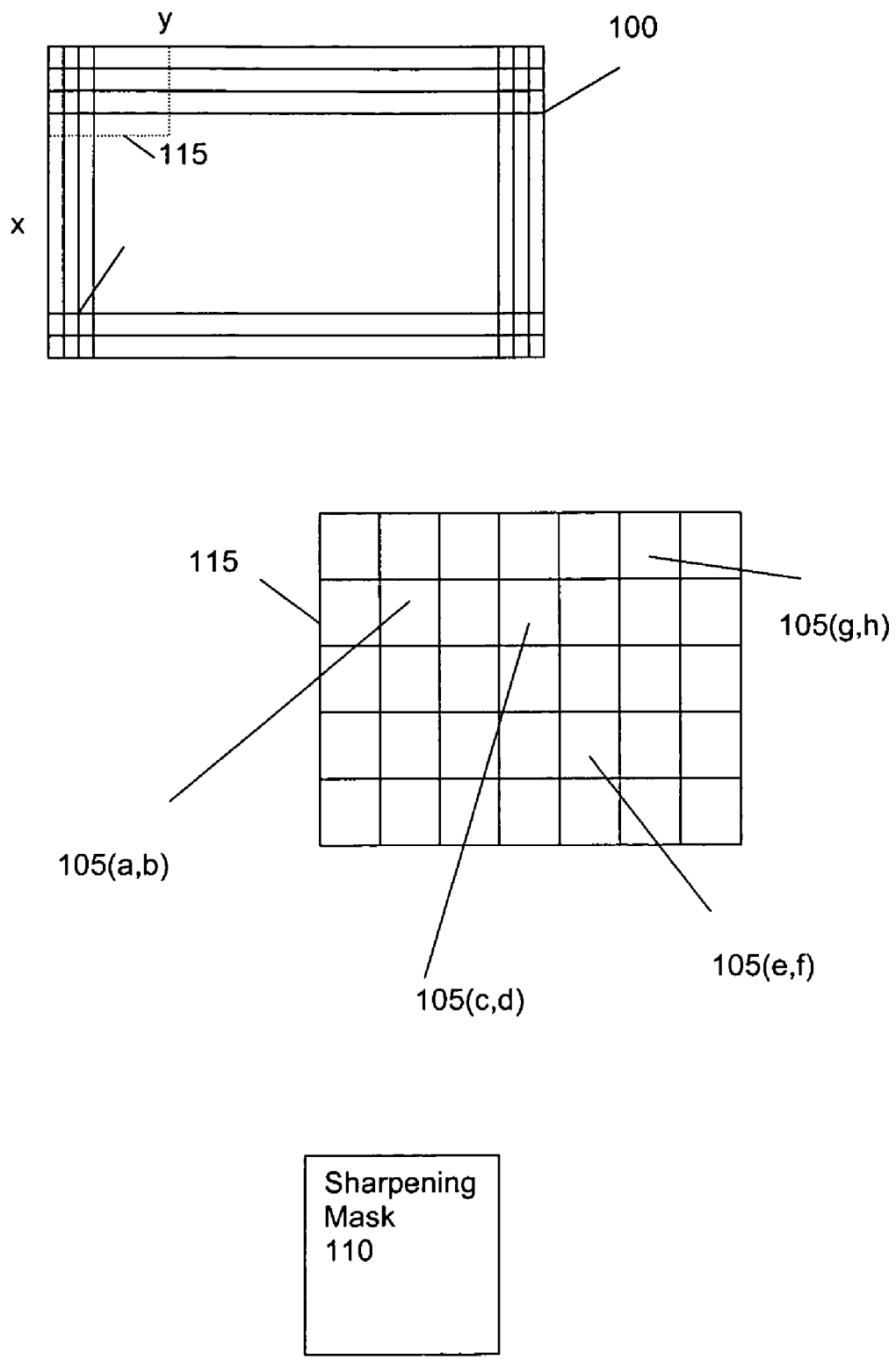
FIG. 1 is a block diagram for sharpening video in accordance with an embodiment of the present invention.

Referring now to FIG. 1, there is illustrated a block diagram for sharpening video data in accordance with an embodiment of the present invention. The video data comprises a series of pictures 100. A picture 100 comprises at least one grid of pixels, 105(x,y). Each pixel 105 is associated with a particular value. The particular value can identify or indicate a color for the pixel 105.

The clarity of the picture 100 can be improved by application of a sharpening mask 110. The sharpening mask 110 sharpens certain edges that appear in the picture 100, thereby improving the quality of video. However, application of a sharpening mask can also create false edges where smooth color transitions occur and emphasize noise.

Accordingly, the sharpening mask 110 dynamically adjusts to the picture 100. The sharpening mask 110 is applied to a region 115 of the picture 100. The sharpening mask 110 is a function of values associated with at least two of the pixels, e.g., 105(a,b) and 105(c,d) in the region 115, and a difference of the values between two pixels, e.g., 105(e,f) and 105(g,h).

Figure 2:
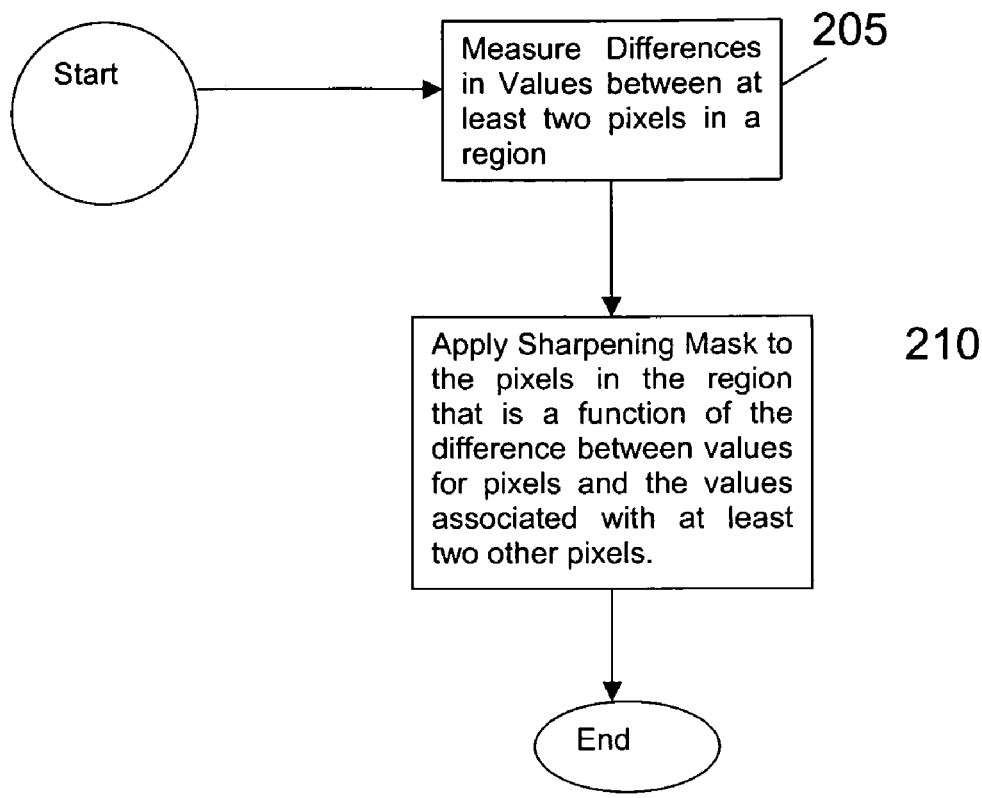
FIG. 2 is a flow diagram for sharpening video in accordance with an embodiment of the present invention.
Figure 3:
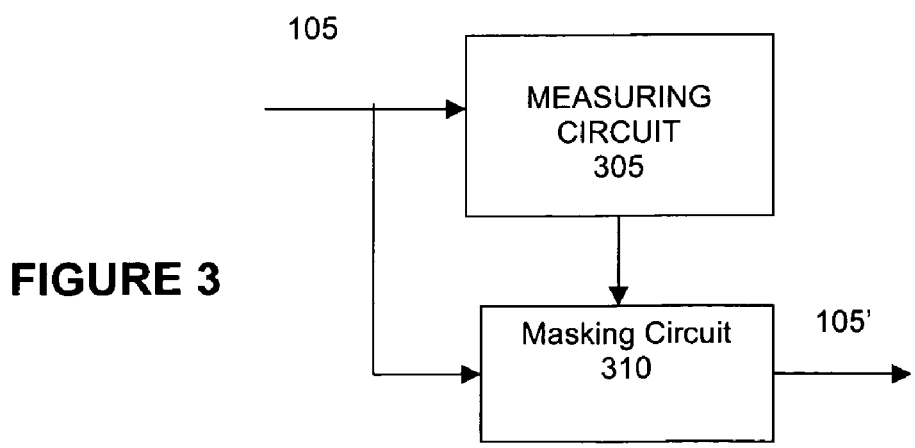
FIG. 3 is a block diagram of an exemplary circuit in accordance with an embodiment of the present invention.

Referring now to FIG. 2, there is illustrated a flow diagram for sharpening video data in accordance with an embodiment of the present invention. FIG. 3 is a block diagram of an exemplary circuit for sharpening video data in accordance with an embodiment of the present invention.

The flow chart of FIG. 2 will be described in connection with the circuit of FIG. 3. At 205, measuring circuit 305 measures differences in values between at least two pixels in a region, e.g., 105(e,f) and 105(g,h). At 210, a masking circuit 310 applies a sharpening mask to the pixels in the region. The sharpening mask 110 is a function the difference between values for pixels 105(e,f) and 105(g,h), and the values associated with two pixels, e.g., 105(*a,b*) and 105(*c,d*). The measuring circuit 305 can receive the values associated with the pixels 105 and provide the difference between values for pixels 105(*e,f*) and 105(*g,h*), as well as the values associated with the two pixels 105(*a,b*) and 105(*c,d*).

In certain embodiments of the present invention, the two pixels 105(*a,b*) and 105(*c,d*) can be associated with the highest and lowest values among all of the pixels 105 in the region 120.

In certain embodiments of the present invention, the pixels 105(*e,f*) and 105(*g,h*) can be neighboring. The pixels 105(*e,f*) and 105(*g,h*) can be neighboring in either the horizontal direction or the vertical direction.

In certain embodiments of the present invention, the pixels 105(*e,f*) and 105(*g,h*) can have the highest differential between neighboring pairs of pixels. Additionally, in certain embodiments of the present invention, the sharpening mask 110 can be a function of more than one difference of pixels.

In certain embodiments of the present invention, the sharpening mask 110 can be a function of ratio of the sum of the differences in values between horizontal and/or vertical pairs of pixels 105 having the having the highest and second highest differential and the difference between the pixels having the highest and lowest pixel values in the region.

Figure 4:
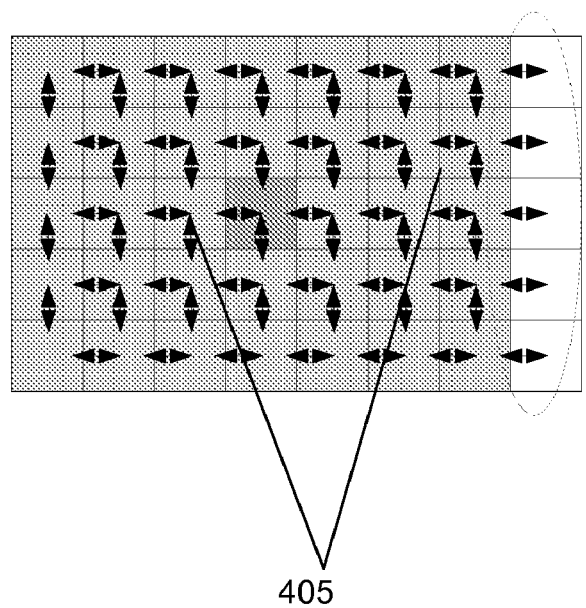
FIG. 4 is a block diagram of an exemplary region of a picture for use with an embodiment of the present invention.

Referring now to FIG. 4, there is illustrated a block diagram of an exemplary region of a picture 100. The region can comprise a block with a predetermined number of columns and rows. In an exemplary embodiment, the block may comprise seven columns and five rows. The following description will be illustrated with a block comprising seven columns and five rows, although it is noted that other embodiments of the present invention may use different numbers of columns and rows.

The region also includes 30 pairs of horizontally neighboring pixels 405, and 28 pairs of vertically neighboring pixels. Each pair of horizontally neighboring pixels and vertically neighboring pixels has a difference between the values for the neighboring pixels.

One of the horizontally neighboring pairs has a highest difference between the values of the horizontally neighboring pixels. Another of the horizontally neighboring pairs has a second highest difference between the values of the horizontally neighboring pixels.

One of the vertically neighboring pairs of pixels has a highest difference between the values of the vertically neighboring pixels. Another of the vertically neighboring pixel pairs has a second highest difference between the values of the vertically neighboring pixels.

Additionally, the region comprises a pixel that is associated with the highest value and a pixel that is associated with the lowest value.

Figure 5A:
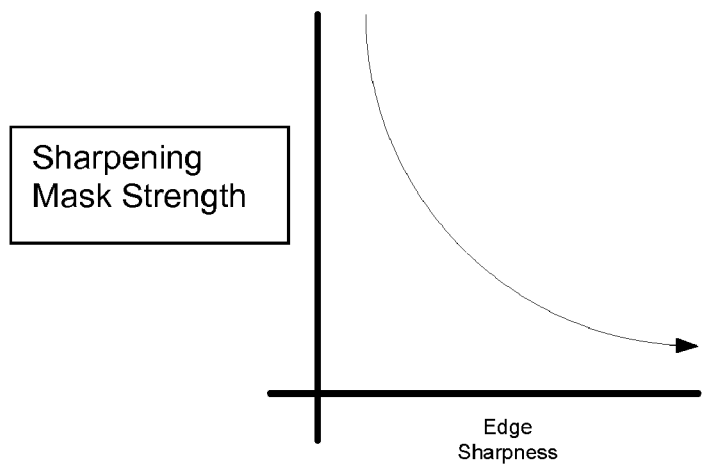
FIG. 5A is a graph describing the relationship between the sharpening mask and the ratio of the sum of the pixel differences and the difference between maximum and minimum values associated with the pixels in the region in accordance with an embodiment of the present invention.

Referring now to FIG. 5A, there is illustrated a graph describing the strength of the sharpening mask 110 that is applied to the region in accordance with an embodiment of the present invention. In certain embodiments of the present invention, the amount of sharpening that is applied to the portion 120 is a function of the ratio:

$$\text{Ratio} = \frac{\text{Max} + \text{Omax}}{\text{maxval} - \text{minval}}$$

where:
maxval=The highest value associated with a pixel in the region minval=The lowest value associated with any pixel in the region Max=The maximum difference between two neighboring pixels Omax=The $2^{nd}$ highest difference between two neighboring pixels In certain embodiments, Max can be the maximum difference between any two horizontally neighboring pixels and the Omax can be the $2^{nd}$ highest difference between any two horizontally neighboring pixels.

In certain embodiments, Max can be the maximum difference between any two vertically neighboring pixels and the Omax can be the $2^{nd}$ highest difference between any two vertically neighboring pixels.

In certain embodiments of the present invention, the ratio can be the higher of the ratios that result from Max being the maximum difference between any two horizontally neighboring pixels and the Omax being the $2^{nd}$ highest difference between any two horizontally neighboring pixels, and Max being the maximum difference between any two vertically neighboring pixels and Omax being the $2^{nd}$ highest difference between any two vertically neighboring pixels.

Referring now to FIG. 5B, there is illustrated a graph of the pixel values describing an exemplary line of neighboring pixels. For illustrative purposes, the value 422 is the maximum value for the pixels maxval in the region, the value 421 is the minimum value minval for the pixels in the region. The difference between values 425 and 424 is the maximum neighboring pixel difference, max. The difference between values 424 and 423 is the second maximum neighboring pixel difference, omax. The ratio is slightly less than unity. Thus the sharpening mask applies a moderate amount of sharpening to the pixels.

Referring now to FIG. 5C, there is illustrated a graph of the pixel values describing another exemplary line of neighboring pixels. For illustrative purposes, the value 433 is the maximum value for the pixels maxval in the region, the value 431 is the minimum value minval for the pixels in the region. The difference between values 435 and 434 is the maximum neighboring pixel difference, max. The difference between values 434 and 433 is the second maximum neighboring pixel difference, omax. The ratio will be low, and thus the sharpening mask applies a higher amount of sharpening to the pixels.

Referring now to FIG. 5D, there is illustrated a graph of the pixel values describing another exemplary line of neighboring pixels having impulse noise. Value 444 for a pixel is characteristic of impulse noise. For illustrative purposes, the value 444 is the maximum value for the pixels maxval in the region, the value 441 is the minimum value minval for the pixels in the region. The difference between values 445 and 444 is the maximum neighboring pixel difference, max. The difference between values 444 and 443 is the second maximum neighboring pixel difference, omax. The ratio will be higher than unity, and thus the sharpening mask applies very little sharpening to the pixels.

Application of a sharpening mask can cause peaking of certain pixels. Certain embodiments of the present invention can correct the peaking by scaling the oversharpened pixels.

Referring now to FIG. 6A, there is illustrated a graph of values for exemplary sharpened pixels in a line. Values 600-605 are for sharpened pixels. Values 600-605 are lower than that original minimum value, minval. Values 611-615 exceed the original maximum value, maxval. Values 606-610 are between the values of minval and maxval.

According to certain embodiments of the present invention, values 600-605 and 611-615 for sharpened pixels that are either lower than the original minimum value, minval, or exceed the original maximum value, maxval, are scaled towards either minval or maxval.

FIG. 6B shows corrected values for sharpened pixels 600-615 in accordance with an embodiment of the present invention.

According to certain embodiments of the present invention, values 606-610 for sharpened pixels are not corrected for peaking.

In one embodiment, the sharpened values for the sharpened pixels are corrected as described by the following equations: The correction value multiplied by the gain:

```
// LUMA_PEAK_SCALE is a programmable value in the range
[0 ..32]
// [0] = allows full peaking
// [32] = no excursions beyond maxval, minval
If (new_pixel > maxval) {new_pixel -= ((new_pixel –
    maxval) * LUMA_PEAK_SCALE)/32;}
If (new_pixel < minval) {new_pixel += ((minval –
    new_pixel) * LUMA_PEAK_SCALE)/32;}
```

Referring now to FIG. 7A, there is illustrated a graph of chroma red 705 and chroma blue values 710 for exemplary pixels. The foregoing may be indicative of a blurry transition from a blue object to a red object.

FIG. 7B is a graph of sharpened chroma red and chroma blue values for the exemplary pixels. As can be seen, the chroma red values 705 and chroma blue values 710 make sharp transitions. However, during the transition, there are periods where both the chroma red values 705 and chroma blue values 710 are high. This results in an undesirable saturation peak.

In certain embodiments of the present invention, the undesirable saturation peak is avoided by making changes to chroma red values contingent on changes to proximate chroma blue values and vice versa.

One embodiment of the present invention can use the equations below to makes to the chroma red pixels and changes to the chroma blue pixels.

Cr & Cb individually multiplied by the gain:

(chroma)Correction=(Correction*CHROMA_GAIN)
    >>9

To help avoid false colors, limit corrections to Cr & Cb when simultaneous changes occur.

```
    U_correction' = U_correction – V_correction *
AVOID_FALSE_COLOR / 8;
    V_correction' = V_correction – U_correction *
AVOID_FALSE_COLOR / 8;
    If (U_correction and V_correction have the same sign)
    {
        U_correction' = U_correction – V_correction *
AVOID_FALSE_COLOR / 8;
        V_correction' = V_correction – U_correction *
AVOID_FALSE_COLOR / 8;
    }
    Else {
        U_correction' = U_correction + V_correction *
AVOID_FALSE_COLOR / 8;
        V_correction' = V_correction + U_correction *
AVOID_FALSE_COLOR / 8;
    }
    If  (U_correction > 0)  {U_correction' = MAX
(U_correction', 0)}
    Else {U_correction' = MIN (U_correction', 0)}
    If  (V_correction > 0)  {V_correction' = MAX
(V_correction', 0)}
    Else {V_correction' = MIN (V_correction', 0)}
U & V corrections are applied to the input pixel:
    U_result = U_input – u_correction
    V_result = V_input – v_correction
    U_result = CLAMP(u_result, u_min, u_max)
    V_result = CLAMP(v_result, v_min, v_max)
```

Figure 8:
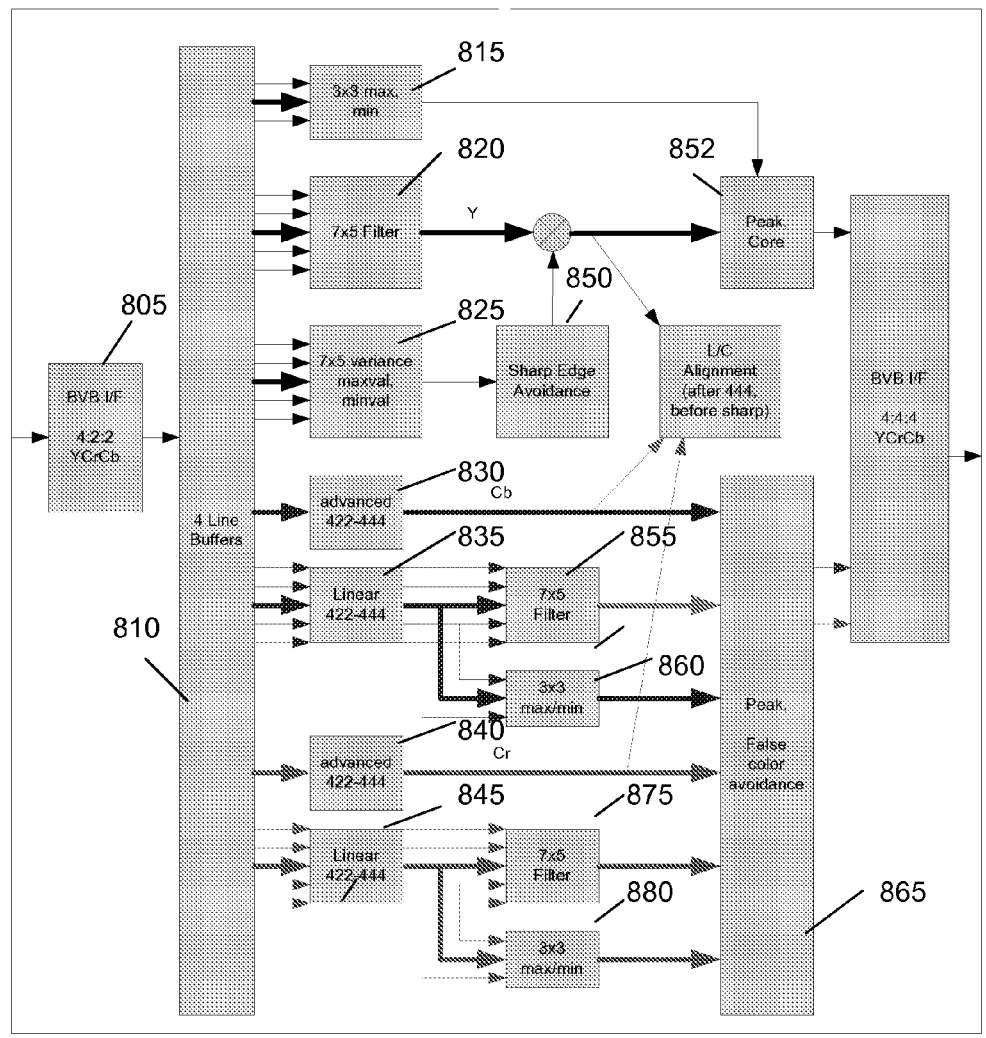
FIG. 8 is a block diagram of an exemplary circuit in accordance with an embodiment of the present invention.

Referring now to FIG. 8, there is illustrated a block diagram describing an exemplary circuit in accordance with an embodiment of the present invention. The circuit comprises an interface 805. The interface 805 provides pixel data to line buffers 810. The line buffers 810 separate the luma pixels L, chroma red pixels Cr, and chroma blue pixels Cb.

Circuit 815, filter 820, and circuit 825 receive the luma pixels L. Advanced 4:2:2→4:4:4 conversion circuit 830 and Linear 4:2:2→4:4:4 conversion circuit 835 receive chroma blue pixels Cb, and Advanced 4:2:2→4:4:4 conversion circuit 840 and Linear 4:2:2→4:4:4 conversion circuit 845 receive the chroma red pixels.

The circuit 815 determines the maximum and minimum values for the 3×3 regions of the picture. Circuit 825 determines the maximum values, minimum values, maximum difference, and minimum difference for associated with pixels in each 7×5 region of the picture and provides the same to sharp edge avoidance circuit 850.

The sharp edge avoidance circuit 850 uses the foregoing values to adapt the edge sharpening mask to sharpen each 7×5 portion. In different embodiments of the present invention, the sharp edge avoidance circuit 850 can use any and/or a combination of the edge sharpening techniques described herein.

The peaking and coring circuit 852 scales oversharpened luma pixels. In certain embodiments of the present invention, the peaking and coring circuit 852 uses any and/or a combination of the peaking techniques described herein.

Linear 4:2:2→4:4:4 conversion circuit 835 provides linearly interpolated chroma blue pixels Cb to a 7×5 filter 855 and circuit 860. Circuit 860 determines the maximum and minimum values associated with pixels in 3×3 regions of the picture. The 7×5 filter provides the filtered chroma blue Cb pixels to a peak and false color avoidance circuit 865. The circuit 860 provides the maximum and minimum values associated with the pixels in the 3×3 regions of the picture to the peak and false color avoidance circuit 865.

Linear 4:2:2→4:4:4 conversion circuit 845 provides linearly interpolated chroma blue pixels Cb to a 7×5 filter 875 and circuit 880. Circuit 880 determines the maximum and minimum values associated with pixels in 3×3 regions of the picture. The 7×5 filter 875 provides the filtered chroma blue Cb pixels to the peak and false color avoidance circuit 865. The circuit 880 provides the maximum and minimum values associated with the pixels in the 3×3 regions of the picture to the peak and false color avoidance circuit 865.

The peak and false color avoidance circuit 865 scales oversharpened chroma pixels and prevents false colors from appearing. In certain embodiments of the present invention, the peak and false color avoidance circuit 865 can use any or a combination of the techniques described here.

Figure 9:
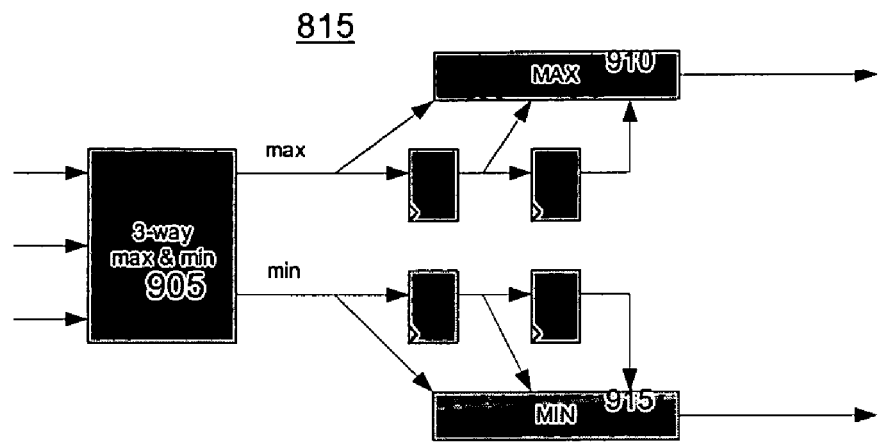
FIG. 9 is a block diagram of an exemplary circuit for determining maximum and minimum pixel values in accordance with an embodiment of the present invention.

Referring now to FIG. 9, there is illustrated a block diagram of circuit 815 for determining the maximum and minimum values of a 3×3 region in accordance with an embodiment of the present invention. The circuit 815 comprises a memory 905, a maximum comparator 910, a minimum comparator 915, a first register 920, and a second register 925.

The memory 905 provides pixel lines to the first and second registers 915 and 920. The memory 905 and first register 915 provide values of three neighboring pixels to the maximum comparator 910. The maximum comparator 910 outputs the maximum pixel values. The memory 905 and second register 910 provides values of three neighboring pixels to the minimum comparator 915. The minimum comparator 915 outputs the minimum pixel values.

It is noted that the maximum and minimum comparators 910 and 915 can provide the maximum and minimum values in a variety of ways. In certain embodiments, the maximum and minimum comparators 910 and 915 can use bubble sorting. Alternatively, each of the three values, e.g., values A, B, and C, can be compared to others of the three values, e.g., [A,B], [A,C], and [B,C]. From the maximum and minimum values for each of the foregoing comparisons, the maximum and minimum values of A, B, and C can be determined.

In certain embodiments of the present invention, if there is a long list of small items, it can be faster and require less circuitry to use a bitwise search. In a bitwise search, all items are enabled. If any item has a most significant bit set, all items without the most significant bit set are disabled. Then if any items have the next most significant bit set, all items without the next most significant bit set are disabled. The foregoing is repeated until only one of the items is enabled.

Figure 10:
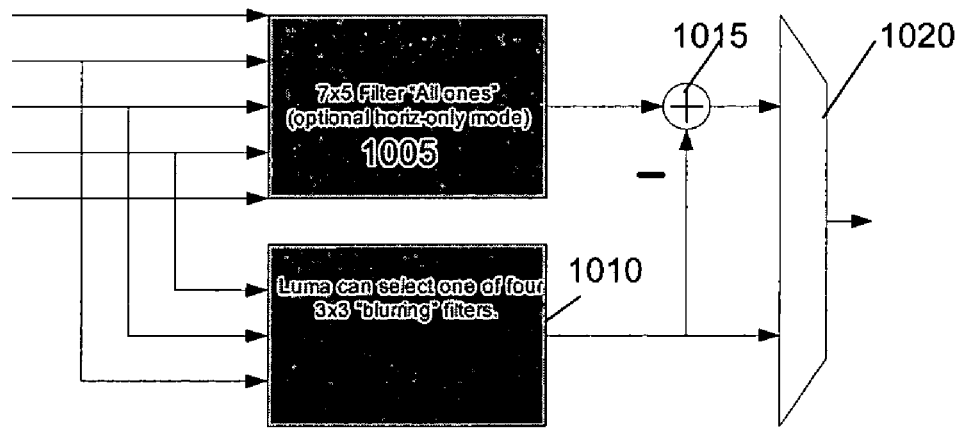
FIG. 10 is a block diagram of an exemplary filter in accordance with an embodiment of the present invention.

Referring now to FIG. 10, there is illustrated a block diagram of an exemplary filter 820 in accordance with an embodiment of the present invention. The filter 820 comprises an all ones filter 1005, blurring filters 1010, an adder 1015, and a selector 1020.

The all ones filter 1005 applies a 35-tap (7 horizontal, 5 vertical) ones filter. An exemplary all ones filter is shown below:

| | | | | | | |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

The all ones filter can be separable and rasterizable. Each column can include four additions. Adding the seven columns uses six additions. Additionally, the all ones filter can be put in a "horizontal only mode" for luma and/or chroma. In horizontal only mode, the all ones filter collapses to

| | | | | | | |
|---|---|---|---|---|---|---|
| 0 | 0 | 0 | 0 | 0 | 0 | 0 |
| 0 | 0 | 0 | 0 | 0 | 0 | 0 |
| 5 | 5 | 5 | 5 | 5 | 5 | 5 |
| 0 | 0 | 0 | 0 | 0 | 0 | 0 |
| 0 | 0 | 0 | 0 | 0 | 0 | 0 |

The blurring filters 1010 can include a plurality of selectable filters 1010. Exemplary filters are shown below:

| | | |
|---|---|---|
| 0 | 0 | 0 |
| 0 | 35 | 0 |
| 0 | 0 | 0 |
| 0 | 2 | 0 |
| 2 | 27 | 2 |
| 0 | 2 | 0 |
| 1 | 4 | 1 |
| 4 | 15 | 4 |
| 1 | 4 | 1 |
| -1 | -2 | -1 |
| -2 | 12 | -2 |
| -1 | -2 | -1 |

Figure 11:
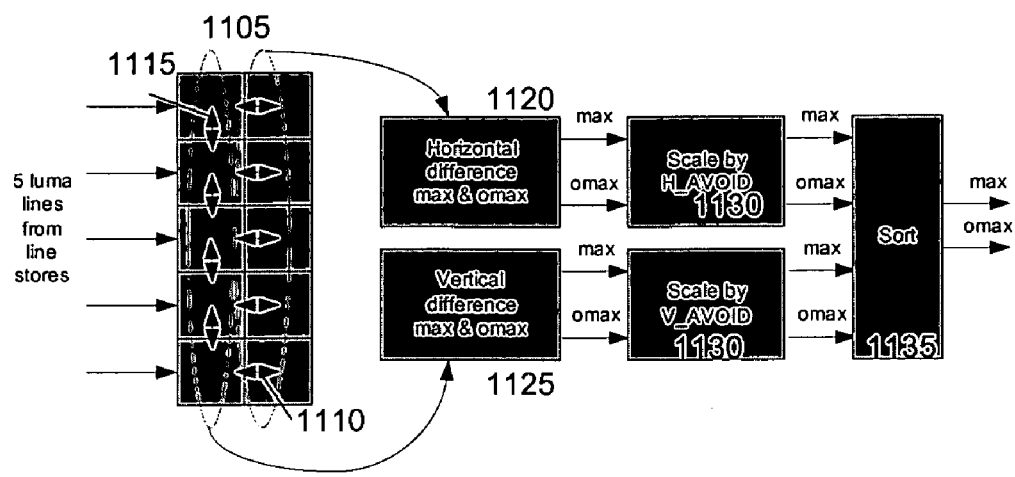
FIG. 11 is a block diagram of a circuit for determining the largest neighboring and second largest neighboring pixel value differences in at least one column.

Referring now to FIG. 11, there is illustrated a block diagram describing a circuit for determining the maximum and second highest pixel value difference for a column in accordance with an embodiment of the present invention. The circuit comprises memory 1105 for storing pairs of horizontally neighboring pixels 1110 and vertically neighboring pixels 1115.

A horizontal difference circuit 1120 determines the maximum max' and second highest omax' difference in values between the pairs of horizontally neighboring pixels 1110 in the column. A vertical difference circuit 1125 determines the maximum max' and second highest omax' difference in values between the pairs of vertically neighboring pixels 1115 in the column.

Scalars 1130 scales the maximum max' and second highest omax' differences among the horizontally neighboring pixels and vertically neighboring pixels in the columns. A sorting circuit 1135 sorts the maximum max' and second highest omax' differences among the horizontally neighboring pixels and vertically neighboring pixels in the column.

Figure 12A:
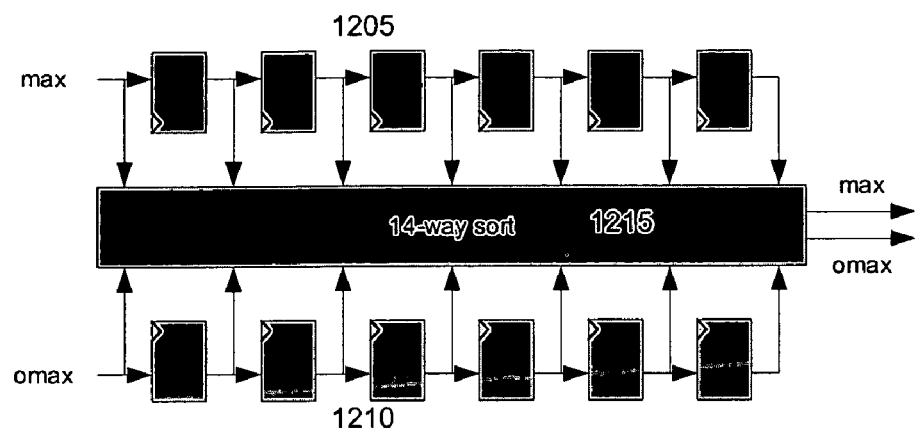
FIG. 12A is a block diagram of a circuit for determining the largest neighboring, and second largest neighboring pixel value differences in accordance with an embodiment of the present invention.

Referring now to FIG. 12A there is illustrated a block diagram of an exemplary circuit for providing the maximum max and second highest omax differences in values between horizontally and vertically neighboring pixels. The circuit comprises a first register 1205 and a second register 1210. The first register 1205 receives the maximum differences max' from each column. The second register 1210 receives the second highest differences omax' from each column. A sorting circuit 1215 provides the maximum max and second highest omax difference in values between horizontally and vertically neighboring pixels for a region.

Figure 12B:
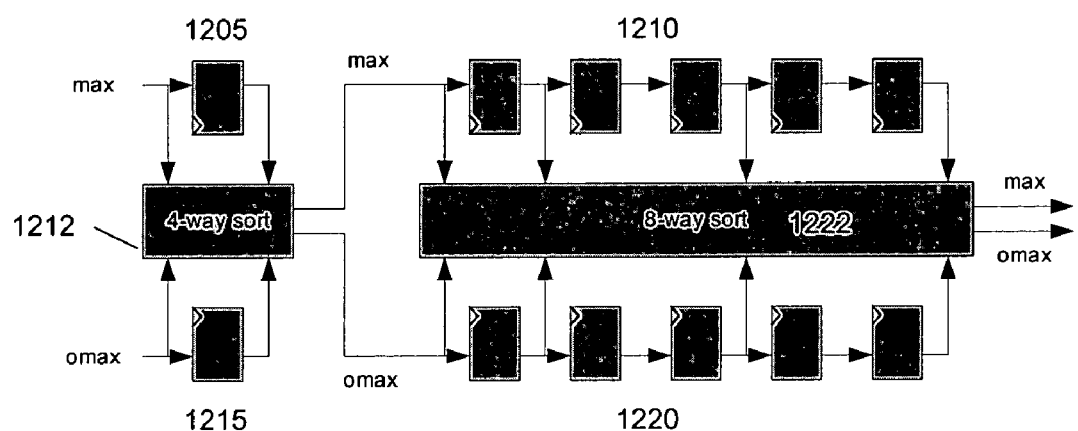
FIG. 12B is a block diagram of circuit for determining the largest neighboring, and second largest neighboring pixel value difference in accordance with another embodiment of the present invention.

Referring now to FIG. 12B, there is illustrated a block diagram of another exemplary circuit for providing the maximum max and second highest omax differences in values between horizontally and vertically neighboring pixels.

The circuit comprises a first register 1205, second register 1210, third register 1215, and fourth register 1220. Certain embodiments of the present invention can use a hierarchical sort. The first register 1205 and second register 1210 first sorts pairs of columns with a 4 way sort 1212. Then the third register 1215 and fourth register 1220 sorts 4 pairs of columns with an 8 way sort 1222.

Figure 13:
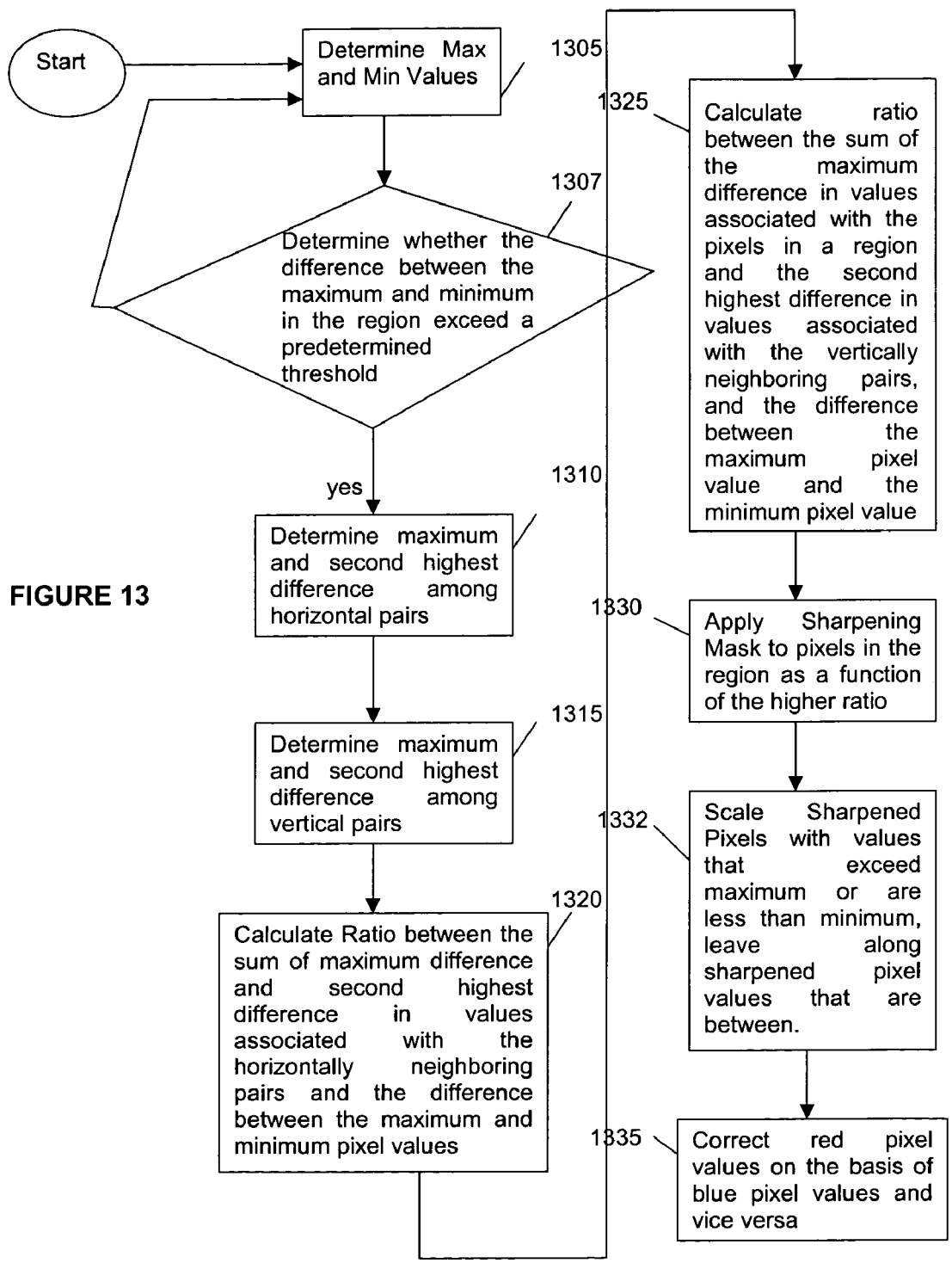
FIG. 13 is a flow diagram for sharpening pixels in accordance with an embodiment of the present invention.

Referring now to FIG. 13, there is illustrated a flow diagram for sharpening a picture in accordance with an embodiment of the present invention.

At 1305, the maximum and minimum values associated with pixels in a region are determined. At 1307, a determination is made whether the difference between maximum and minimum pixel values in the region exceed a predetermined threshold. If the maximum and minimum difference exceed the predetermined threshold, at 1310, the maximum difference and second highest difference among the horizontally neighboring pairs is determined. At 1315, the maximum difference and second highest difference among the vertically neighboring pairs is determined.

If at 1307, the difference between the maximum and minimum values of pixels in the region do not exceed the predetermined threshold, 1310-1335 are bypassed, and 1305 is repeated for the next region.

At 1320, a ratio is calculated between the sum of the maximum difference in values associated with the pixels in a region and the second highest difference in values associated with the horizontally neighboring pairs, and the difference between the maximum pixel value and the minimum pixel value. At 1325, a ratio is calculated between the sum of the maximum difference in values associated with the pixels in a region and the second highest difference in values associated with the vertically neighboring pairs, and the difference between the maximum pixel value and the minimum pixel value.

At 1330, a sharpening mask is applied to the pixels in the region as a function of the higher of the ratios between the ratios calculated during 1320 and 1325. The sharpening mask is inversely related to the ratio, wherein the sharpening mask applies more sharpening where the ratio is lower and less sharpening where the ratio is high.

At 1332, the sharpened pixels with values that exceed the maximum pixel value (determined at 1305) and sharpened pixels with values that are lower than the minimum pixel value (determined at 1305) are scaled while the sharpened pixels with values that are between the second value and the first pixel value are left alone. At 1335, chroma red pixel values for sharpened pixels are corrected based on a blue pixel value for sharpened pixels, and vice versa, and 1305 is repeated for the next region.

The embodiments described herein may be implemented as a board level product, as a single chip, application specific integrated circuit (ASIC), or with varying levels of the system integrated with other portions of the system as separate components. Alternatively, if the processor is available as an ASIC core or logic block, then the commercially available processor can be implemented as part of an ASIC device wherein certain aspects of the present invention are implemented as firmware.

The degree of integration may primarily be determined by the speed and cost considerations. Because of the sophisticated nature of modern processors, it is possible to utilized a commercially available processor, which may be implemented external to an ASIC implementation.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for sharpening edges, said method comprising:
   measuring differences between at least a value associated with a first pixel and a value associated with second pixel of a plurality of pixels with a circuit; and
   applying a sharpening mask to the plurality of pixels, wherein the sharpening mask is a function of at least one of the measured differences, a first value associated with any of the plurality of pixels, and a second value associated with any other of the pixels, thereby resulting in sharpened pixels;
   wherein measuring differences further comprises measuring differences between values associated with neighboring pairs of the plurality of pixels;
   wherein the neighboring pairs of pixels comprise horizontally neighboring pairs;
   wherein the neighboring pairs of pixels comprise vertically neighboring pairs; and
   wherein the at least one of the measured differences comprises a highest one of the measured differences from the vertically neighboring pairs, a second highest one of the differences from the vertically neighboring pairs, a highest one of the measured differences from the horizontally neighboring pairs, and a second highest one of the measured differences from the horizontally neighboring pairs.

2. The method of claim 1, wherein measuring differences further comprises:
   measuring differences between values associated with neighboring pairs of the plurality of pixels.

3. The method of claim 2, wherein the at least one differences comprises a maximum one of the measured differences.

4. The method of claim 3, wherein the at least one differences comprises a second highest one of the measured differences.

5. The method of claim 2, wherein the neighboring pairs of pixels comprise horizontally neighboring pairs.

6. The method of claim 5, wherein the neighboring pairs of pixels comprise vertically neighboring pairs.

7. The method of claim 6, wherein the at least one of the measured differences comprises a highest one of the measured differences from the vertically neighboring pairs, a second highest one of the differences from the vertically neighboring pairs, a highest one of the measured differences from the horizontally neighboring pairs, and a second highest one of the measured differences from the horizontally neighboring pairs.

8. The method of claim 7, wherein the first value associated with the plurality of pixels is a highest value associated with the plurality of pixels, and wherein the second value is the lowest value associated with the plurality of pixels.

9. The method of claim 8, wherein the sharpening mask is a function of a first ratio, said first ratio being a ratio of the sum of the highest one of the measured differences from the horizontally neighboring pairs and the second highest one of the measured differences from the horizontally neighboring pairs and the difference between the first value and the second value.

10. The method of claim 9, wherein the sharpening mask is also a function of a first ratio, said first ratio being a ratio of the sum of the highest one of the measured differences from the vertically neighboring pairs and the second highest one of the measured differences from the vertically neighboring pairs and the difference between the first value and the second value.

11. The method of claim 10, wherein the sharpening mask provides less masking if either the first ratio or second ratio are high.

12. The method of claim 1, further comprising:
   scaling sharpened pixels with values that exceed the first pixel value and sharpened pixels with values that are lower than the second value.

13. The method of claim 12, further comprising:
   leaving sharpened pixels with values that are between the second value and the first pixel value.

14. The method of claim 12, wherein if the difference between the first value and the second luma value is lower than a predetermined threshold, replacing the sharpened pixels with the original pixels.

15. The method of claim 1, further comprising:
   correcting a red pixel value for a sharpened pixel based on a blue pixel value for another sharpened pixel.

16. The method of claim 1, wherein applying a sharpening mask further comprises applying a same sharpening mask to each of the plurality of pixels, thereby resulting in changes to each of the plurality of pixels.

17. The method of claim 1, wherein the sharpening mask comprises a plurality of values that are corresponding to the plurality of pixels, wherein each of the plurality of values are different from the corresponding one of the plurality of pixels, thereby resulting in changes to each of the plurality of pixels.

18. A system for sharpening edges, said method comprising:
- a first circuit for measuring differences between at least a value associated with a first pixel and a value associated with a second pixel of a plurality of pixels; and
- a filter for applying a sharpening mask to the plurality of pixels, wherein the sharpening mask is a function of at least one of the measured differences, a first value associated with any one of the plurality of pixels, and a second value associated with any other of the pixels, thereby resulting in sharpened pixels;
- wherein measuring differences further comprises measuring differences between values associated with neighboring pairs of the plurality of pixels;
- wherein the neighboring pairs of pixels comprise horizontally neighboring pairs;
- wherein the neighboring pairs of pixels comprise vertically neighboring pairs; and
- wherein the at least one of the measured differences comprises a highest one of the measured differences from the vertically neighboring pairs, a second highest one of the differences from the vertically neighboring pairs, a highest one of the measured differences from the horizontally neighboring pairs, and a second highest one of the measured differences from the horizontally neighboring pairs.

19. The system of claim 18, wherein the at least one of the differences comprises a maximum one of the measured differences.

20. The system of claim 19, wherein the at least one differences comprises a second highest one of the measured differences.

21. The system of claim 18, wherein the first value associated with the plurality of pixels is a highest value associated with the plurality of pixels, and wherein the second value is the lowest value associated with the plurality of pixels.

22. The system of claim 21, wherein the sharpening mask is a function of a first ratio, said first ratio being a ratio of the sum of the highest one of the measured differences from the horizontally neighboring pairs and the second highest one of the measured differences from the horizontally neighboring pairs and the difference between the first value and the second value.

23. The system of claim 22, wherein the sharpening mask is also a function of a first ratio, said first ratio being a ratio of the sum of the highest one of the measured differences from the vertically neighboring pairs and the second highest one of the measured differences from the vertically neighboring pairs and the difference between the first value and the second value.

24. The system of claim 23, wherein the sharpening mask provides less masking if either the first ratio or second ratio are high.

25. The system of claim 18, further comprising a second circuit for scaling sharpened pixels with values that exceed the first pixel value and sharpened pixels with values that are lower than the second value.

26. The system of claim 18, further comprising a third circuit for correcting a red pixel value for a sharpened pixel based on a blue pixel value for another sharpened pixel.

27. The system of claim 18, wherein applying a sharpening mask further comprises applying a same sharpening mask to each of the plurality of pixels.

28. The system of claim 18, wherein the sharpening mask comprises a plurality of values that are corresponding to the plurality of pixels, wherein each of the plurality of values are different from the corresponding one of the plurality of pixels, thereby resulting in changes to each of the plurality of pixels.

29. A method for sharpening edges, said method comprising:
- measuring differences between at least a value associated with a first pixel and a value associated with second pixel of a plurality of pixels with a circuit;
- applying a sharpening mask to the plurality of pixels, wherein the sharpening mask is a function of at least one of the measured differences, a first value associated with any of the plurality of pixels, and a second value associated with any other of the pixels, thereby resulting in sharpened pixels; and
- scaling sharpened pixels with values that exceed the first pixel value and sharpened pixels with values that are lower than the second value with a second circuit.

30. The method of claim 29, wherein measuring differences further comprises:
- measuring differences between values associated with neighboring pairs of the plurality of pixels.

31. The method of claim 30, wherein the at least one differences comprises a maximum one of the measured differences.

32. The method of claim 31, wherein the at least one differences comprises a second highest one of the measured differences.

33. The method of claim 29, wherein the neighboring pairs of pixels comprise horizontally neighboring pairs.

34. The method of claim 33, wherein the neighboring pairs of pixels comprise vertically neighboring pairs.

35. The method of claim 34, wherein the at least one of the measured differences comprises a highest one of the measured differences from the vertically neighboring pairs, a second highest one of the differences from the vertically neighboring pairs, a highest one of the measured differences from the horizontally neighboring pairs, and a second highest one of the measured differences from the horizontally neighboring pairs.

36. The method of claim 35, wherein the first value associated with the plurality of pixels is a highest value associated with the plurality of pixels, and wherein the second value is the lowest value associated with the plurality of pixels.

37. The method of claim 36, wherein the sharpening mask is a function of a first ratio, said first ratio being a ratio of the sum of the highest one of the measured differences from the horizontally neighboring pairs and the second highest one of the measured differences from the horizontally neighboring pairs and the difference between the first value and the second value.

38. The method of claim 37, wherein the sharpening mask is also a function of a first ratio, said first ratio being a ratio of the sum of the highest one of the measured differences from the vertically neighboring pairs and the second highest one of the measured differences from the vertically neighboring pairs and the difference between the first value and the second value.

39. The method of claim 38, wherein the sharpening mask provides less masking if either the first ratio or second ratio are high.

40. The method of claim 29, further comprising:
scaling sharpened pixels with values that exceed the first pixel value and sharpened pixels with values that are lower than the second value.

41. The method of claim 40, further comprising:
leaving sharpened pixels with values that are between the second value and the first pixel value.

42. The method of claim 40, wherein if the difference between the first value and the second luma value is lower than a predetermined threshold, replacing the sharpened pixels with the original pixels.

43. The method of claim 29, further comprising:
correcting a red pixel value for a sharpened pixel based on a blue pixel value for another sharpened pixel.

44. The method of claim 29, wherein applying a sharpening mask further comprises applying a same sharpening mask to each of the plurality of pixels, thereby resulting in changes to each of the plurality of pixels.

45. The method of claim 29, wherein the sharpening mask comprises a plurality of values that are corresponding to the plurality of pixels, wherein each of the plurality of values are different from the corresponding one of the plurality of pixels, thereby resulting in changes to each of the plurality of pixels.

46. A system for sharpening edges, said method comprising:
a first circuit for measuring differences between at least a value associated with a first pixel and a value associated with a second pixel of a plurality of pixels;
a filter for applying a sharpening mask to the plurality of pixels, wherein the sharpening mask is a function of at least one of the measured differences, a first value associated with any one of the plurality of pixels, and a second value associated with any other of the pixels, thereby resulting in sharpened pixels; and
a second circuit for scaling sharpened pixels with values that exceed the first pixel value and sharpened pixels with values that are lower than the second value.

47. The system of claim 46, wherein the at least one of the differences comprises a maximum one of the measured differences.

48. The system of claim 47, wherein the at least one differences comprises a second highest one of the measured differences.

49. The system of claim 46, wherein the first value associated with the plurality of pixels is a highest value associated with the plurality of pixels, and wherein the second value is the lowest value associated with the plurality of pixels.

50. The system of claim 49, wherein the sharpening mask is a function of a first ratio, said first ratio being a ratio of the sum of the highest one of the measured differences from the horizontally neighboring pairs and the second highest one of the measured differences from the horizontally neighboring pairs and the difference between the first value and the second value.

51. The system of claim 50, wherein the sharpening mask is also a function of a first ratio, said first ratio being a ratio of the sum of the highest one of the measured differences from the vertically neighboring pairs and the second highest one of the measured differences from the vertically neighboring pairs and the difference between the first value and the second value.

52. The system of claim 51, wherein the sharpening mask provides less masking if either the first ratio or second ratio are high.

53. The system of claim 46, further comprising a second circuit for scaling sharpened pixels with values that exceed the first pixel value and sharpened pixels with values that are lower than the second value.

54. The system of claim 46, further comprising a third circuit for correcting a red pixel value for a sharpened pixel based on a blue pixel value for another sharpened pixel.

55. The system of claim 46, wherein applying a sharpening mask further comprises applying a same sharpening mask to each of the plurality of pixels.

56. The system of claim 46, wherein the sharpening mask comprises a plurality of values that are corresponding to the plurality of pixels, wherein each of the plurality of values are different from the corresponding one of the plurality of pixels, thereby resulting in changes to each of the plurality of pixels.

* * * * *